United States Patent [19]

Dickson

[11] Patent Number: 4,970,798
[45] Date of Patent: Nov. 20, 1990

[54] RECESS CONTOUR GAUGE

[75] Inventor: James O. Dickson, Smithville, Canada

[73] Assignee: Westinghouse Electric Corp., Pittsburgh, Pa.

[21] Appl. No.: 468,662

[22] Filed: Jan. 23, 1990

[30] Foreign Application Priority Data

Feb. 3, 1989 [CA] Canada .................................. 590143

[51] Int. Cl.⁵ .............................................. G01B 3/00
[52] U.S. Cl. ............................... 33/501.45; 33/501.6; 33/546
[58] Field of Search ................ 33/545, 546, 551, 552, 33/554, 501.45, 501, 567, 501.08, 501.6

[56] References Cited

U.S. PATENT DOCUMENTS 4,219,938 9/1980 Tommeraas ..................... 33/546 X

FOREIGN PATENT DOCUMENTS 646043 11/1950 United Kingdom .................. 33/567
783980 10/1957 United Kingdom .................. 33/549

Primary Examiner—Harry N. Haroian

[57] ABSTRACT

The blade root grooves in a turbine disc are gauged for accuracy by a body resembling the blade root which includes electronic distance gauges in its surfaces. The body is introduced into a reference groove with two surfaces in contact with the groove surfaces and the distance between the other surfaces of the body and the corresponding surfaces of the reference groove displayed. The display is adjusted so that all the distances displayed are equal. The body may then be introduced into a disc groove during production and will indicate whether the disc groove being machined corresponds to the reference groove.

7 Claims, 1 Drawing Sheet

U.S. Patent    Nov. 20, 1990    4,970,798
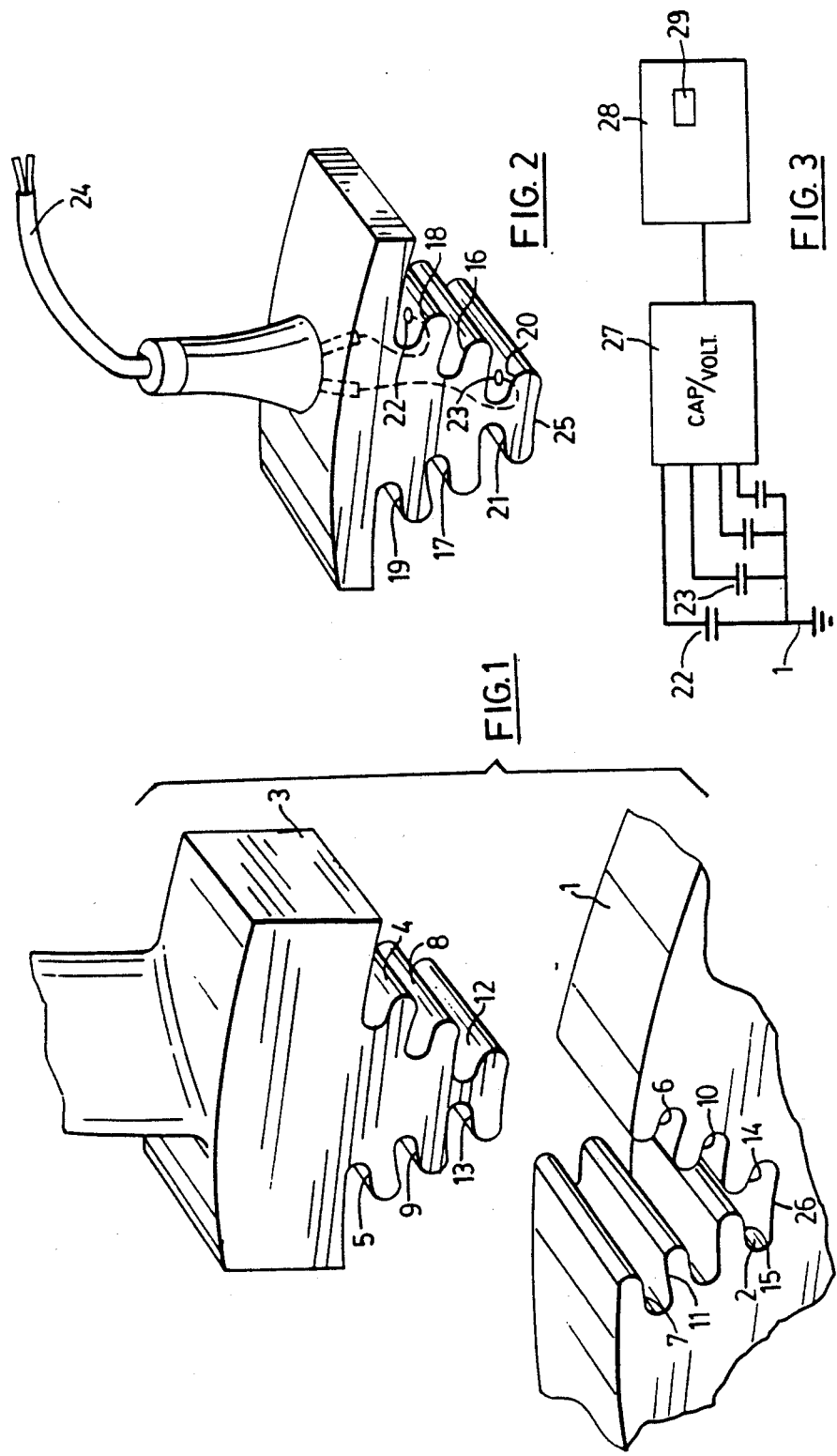

RECESS CONTOUR GAUGE

FIELD OF THE INVENTION

This invention relates to gauges for determining the accuracy of a recess formed in a solid material, in particular, a recess formed to engage a specific geometrical shape at more than one point or surface.

DESCRIPTION OF THE PRIOR ART

In the production of gas turbines, apertures have to be formed in the rotor disc to receive the ends of the blades. Engagement between the blade and the disc is normally in the form referred to as a fir tree. Engagement between the base or root of the blade and the aperture or groove in the disc is such as to produce a plurality of mating force-bearing surfaces. The forces involved, of course, are those caused by the centrifugal forces occurring in the blade during high speed rotation. It is essential that these forces be distributed evenly into the disc and it is therefore essential that the aperture in the disc conform closely to the shape at the base or root of the blade.

In the past, when the apertures are formed in the disc by a broaching procedure, the only method of checking the accuracy of the aperture and its conformation with the shape of the base of the blade has been to complete one such aperture in the disc, cast a suitable material in the aperture, remove the cast product, machine the end surface square, and then optically measure the shape of the cast object by comparison with a reference standard.

It will be evident that such a procedure introduces substantial delays in the machining process since it requires that the process be interrupted while a sample casting is formed and checked. It is also evident that it would be preferable to have a gauge which can be used during the broaching process to determine whether the apertures being formed are falling within the set limits.

Gauges have been proposed in the past for measuring contours and for measuring the relative position of surfaces on a contour. Canadian Patent No. 1,145,931 is an example of a gauging device for measuring the relative position of two surfaces of an object. It will be seen that in that patent a pair of probes contact two surfaces on the object and compare their relative position. This gauge, however, only measures the relative positions of two surfaces.

SUMMARY OF THE INVENTION

In accordance with the present invention, a gauge is provided which has a reference surface which engages a reference surface in the aperture and a plurality of ridges corresponding to the location of the bearing surfaces of the aperture. Capacitance probes are located on these surfaces to detect the distance between these surfaces and the bearing surfaces in the aperture formed in the disc when the reference surface is in full contact with the aperture surface of the disc. Outputs from the capacitance probes are compared and provide an accurate indication of the relative locations of the bearing surfaces of the aperture. The gauge can be introduced into the aperture at any time during the machining process to determine whether the broached aperture conforms to the standard.

BRIEF DESCRIPTION OF THE DRAWINGS

A clearer understanding of our invention may be had from consideration of the drawings in which:

FIG. 1 is an illustration of a disc with a fir tree aperture and the corresponding root portion of a turbine blade.

FIG. 2 is an illustration of the gauge in accordance with our invention.

FIG. 3 is a block diagram of the electrical system associated with the gauge.

DESCRIPTION OF THE PREFERRED EMBODIMENT

Considering first FIG. 1, there is shown a rotor disc for a gas turbine designated 1 and the recess 2 which has been broached into the disc in the form referred to as a fir tree. The mating turbine blade is shown above at 3 and it will be seen the blade has a root section, also a fir tree form, to mate with the aperture in the disc. The surfaces 4 and 5 on the blade root mate with corresponding surfaces 6 and 7 in the aperture and similarly, surfaces 8 and 9 on the root mate with surfaces 10 and 11 in the aperture and surfaces 12 and 13 on the blade root mate with surfaces 14 and 15 on the aperture.

It will be evident that proper distribution of the forces generated during high speed rotation is essential if the material of the blade root and rotor disk are not to be over-stressed. It is therefore desirable to ensure that the aperture conforms to a desired standard which, of course, is set by the shape of the blade root.

The gauge shown in FIG. 2 is of a shape generally corresponding to a fir tree, but only certain of its surfaces are critical. In particular, surfaces 10 and 11 in the aperture may be used as the references surfaces, in which case, surfaces 16 and 17 become the references surfaces on the gauge and surfaces 18, 19, 20 and 21 are cut back 0.0015" to 0.0020" to avoid contact with the corresponding surfaces of the aperture. The body of the gauge is formed from any suitable material which will withstand the wear incurred during use and be sufficiently stable to ensure that its shape will not change undesirably during thermal variations and normal use. Typically the body will be formed from high carbon steel or tool steel or similar material. As can be seen, the measuring surfaces of the gauge, that is surfaces 18, 19, 20 and 21, each incorporate a capacitance probe which is located slightly below the surface to protect it from engagement with the aperture when the gauge is inserted. These probes, only two of which can be seen at 22 and 23, are connected through conductors through the body of the gauge through a multiple conductor 24 to a suitable electronic circuit.

In operation, the gauge is inserted into an aperture in a disc which is to be measured. The lower surface of the gauge 25 resiliently engages the lower surface 26 of the aperture and urges surfaces 16 and 17 into firm contact with surfaces 10 and 11, thus establishing a reference position for the gauge. The position of surfaces 6, 7, 14 and 15 may now be determined by measuring the relative distance of the various capacitance probes from these surfaces.

Turning now to FIG. 3, it will be seen the outputs from the capacitance probes are coupled to an electronic circuit 27 which converts the capacity measured between the probe and its adjacent surface into a voltage. By means of suitable switching, the voltages representative of the various capacities can be displayed on a suitable visual display 28. The display may, for example, show a digital readout 29 representative of the spacing between a surface on the gauge and a surface in the aperture. Typically, the readout at 29 might represent the spacing between surface 18 on the gauge and surface 6 in the aperture when probe 22 is selected. The values may also be printed out to provide a record for future reference.

In the production of the gauge it will, of course, be necessary to establish the relative location of the probe and it will be convenient to do this by producing a reference aperture which may then be used to standardize the gauge. In set up, the electronic circuit 27 will be adjusted so that the output from all of the capacitor probes is equal when the gauge is inserted in the reference cavity.

It will be understood that a specific gauge must be produced for each fir tree aperture which is to be measured, but the method of production of the gauge and its connection to the electronics will be identical in each case. It will also be understood that while the gauge is intended for use during production, care has to be observed during its use to avoid the presence of oil or other non-air dielectrics during the gauging process.

While the gauge has been described as using capacitance probes, it will be understood that other methods of producing electrical signals representative of the spacing between two surfaces could also be used.

I claim:

1. A gauge for measuring the relative locations of a plurality of surfaces in an aperture comprising:
   (a) a body having a contour resembling the cross-section of said aperture;
   (b) at least two reference surfaces in said aperture;
   (c) first surfaces on said body corresponding to said reference surfaces;
   (d) at least one other surface on said body adjacent but not touching a further surface in said aperture when said first surfaces and said reference surfaces are in full contact;
   (e) a probe mounted in said other surface; and
   means including said probe for determining the distance between said other surface and said further surface.

2. A gauge as claimed in claim 1 wherein the aperture is the fir tree shaped blade mounting aperture in the disc for a turbine.

3. A gauge as claimed in claim 1 wherein the probe is a capacitive distance probe.

4. A gauge as claimed in claim 3 wherein the reference surfaces are a pair of surfaces in the fir tree aperture on opposite sides and equidistant from the periphery of the disc.

5. A gauge as claimed in claim 4 wherein the other surfaces are at least two surfaces on opposite sides of the fir tree aperture equidistant from the periphery of the disc.

6. A method of measuring the accuracy of machining of a fir tree blade root groove in a turbine disc comprising:
   (a) forming a body similar to the blade root;
   (b) maintaining two surfaces of said body in contact with corresponding surfaces of said groove by force in a radially outward direction in respect of said disc;
   (c) measuring the distance between other surfaces of said body and corresponding surfaces of said groove.

7. A method of measuring the accuracy of machining of a fir tree blade root groove as claimed in claim 6 wherein the distances between other surfaces of said body and the corresponding surfaces is displayed and the display adjusted to a nominal value while measuring a reference groove.

* * * * *